June 10, 1941.  F. KAPELMAN  2,244,952
DISPENSING DEVICE
Filed Aug. 8, 1939   2 Sheets-Sheet 1

INVENTOR.
FELIX KAPELMAN
BY
ATTORNEYS.

June 10, 1941. F. KAPELMAN 2,244,952
DISPENSING DEVICE
Filed Aug. 8, 1939 2 Sheets-Sheet 2
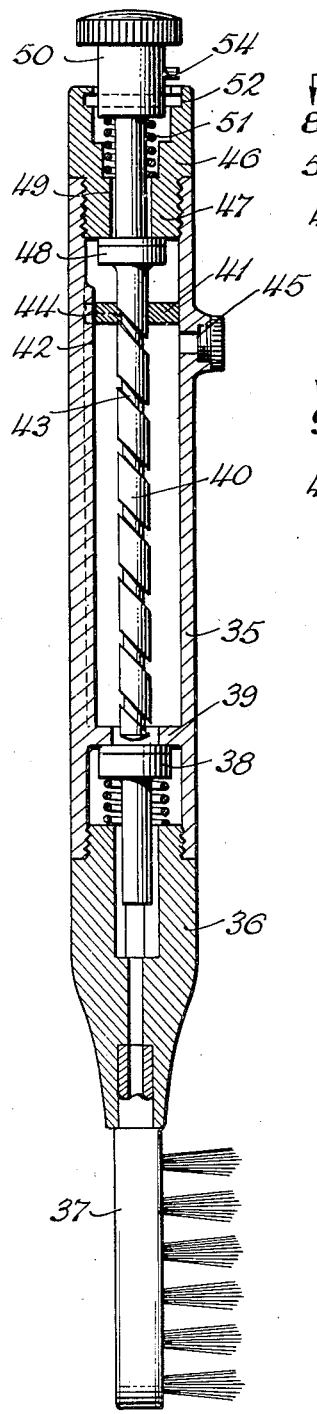
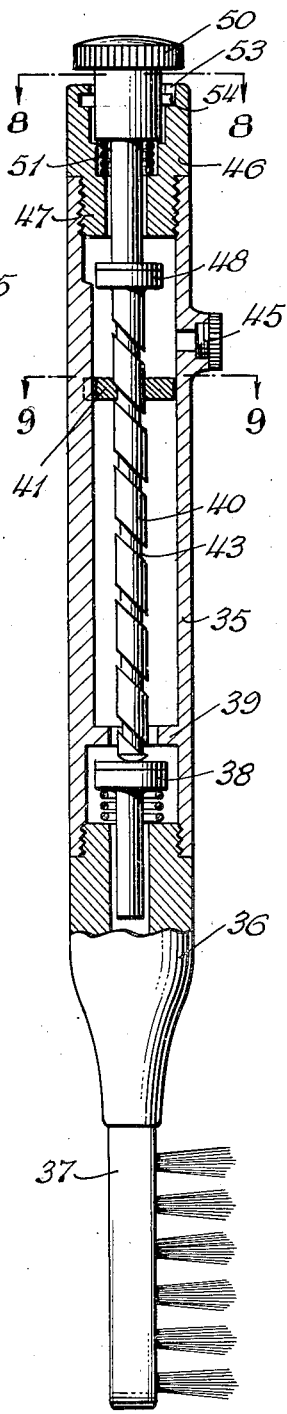
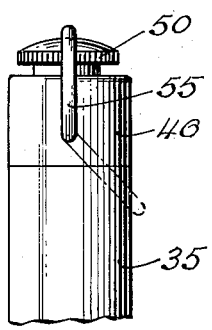
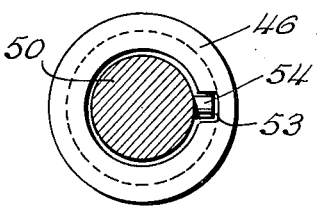
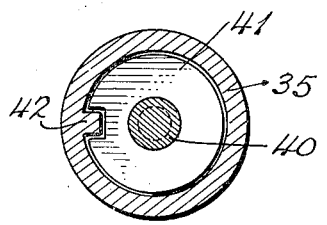
INVENTOR.
FELIX KAPELMAN
BY
ATTORNEYS.

Patented June 10, 1941

2,244,952

UNITED STATES PATENT OFFICE 2,244,952

DISPENSING DEVICE

Felix Kapelman, Bronx, N. Y.

Application August 8, 1939, Serial No. 288,937

2 Claims. (Cl. 221—79)

This invention relates to improvements in tooth brushes and has particular reference to a fountain tooth brush.

An object of the invention is to provide an improved tooth brush of simple and practical construction wherein means are provided for effecting the discharge of a cleansing material, such as a liquid or cream, from a reservoir to a brush nozzle from whence said material is discharged over the bristles of the brush.

Another object is to provide a valve controlled reservoir in the handle of a brush for the discharge of the contents of said reservoir and the admission of air into the latter to facilitate said discharge, and to operate the discharge and air intake valves by the manipulation of a plunger rod, or its equivalent, which is slidably mounted in the handle of the implement and extended through said reservoir for direct operating contact with said discharge valve.

The above and other objects will appear more closely from the following detailed description when taken in connection with the accompanying drawings which illustrate preferred embodiments of the inventive idea.

In the drawings—

Figure 6 is a view similar to Figure 1, illustrating another form of the invention especially adapted for the discharge of tooth paste or cream.

Figure 7 is a view similar to Figure 6 showing the parts in discharging position.

Figure 8 is a section on the line 8—8 of Figure 7.

Figure 9 is a section on the line 9—9 of Figure 7, and,

Figure 10 is a fragmentary elevation showing a different form of holding means for the operating member, from that shown in Figures 6 and 7.

Figure 1:
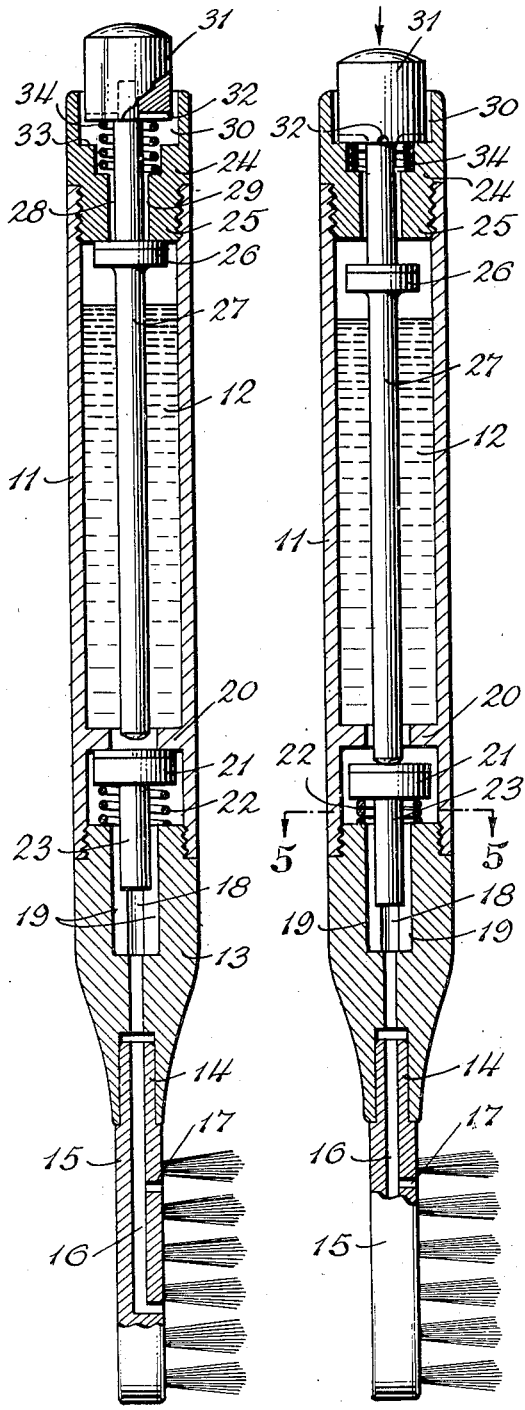
Figure 1 is a vertical longitudinal section through the tooth brush constructed in accordance with one form of the invention, the air intake and discharge valves being shown in their normally closed positions.
Figure 2:
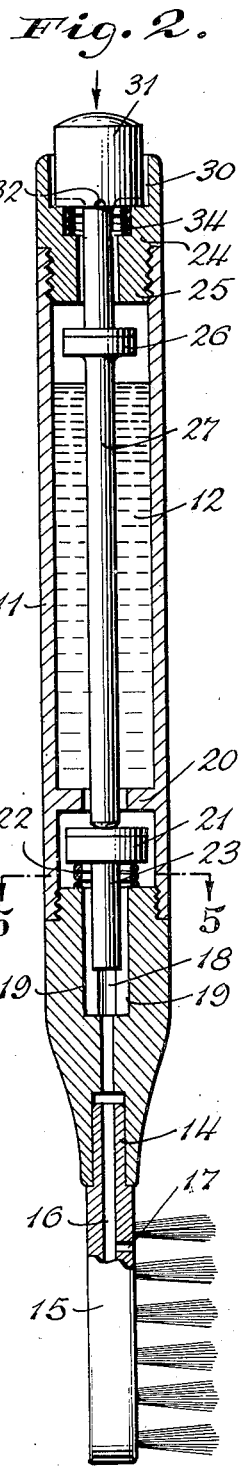
Figure 2 is a view similar to Figure 1 showing the valves in opened position.
Figure 3:
Figure 3 is an elevation of the handle portion of the tooth brush.
Figure 4:
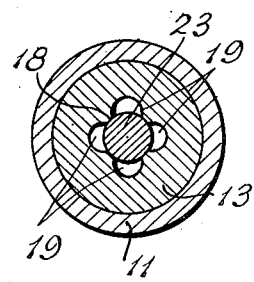
Figure 4 is a similar view of the brush portion, showing the same detached from the handle portion.
Figure 5:
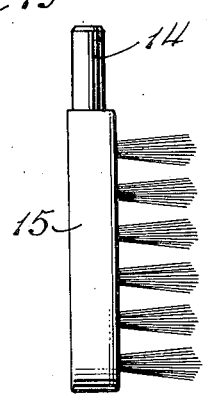
Figure 5 is a section on the line 5—5 of Figure 2.

Referring more particularly to Figures 1 to 5 of the drawings, the numeral 11 designates a cylindrical body for the tooth brush which forms a handle therefor, and which constitutes a reservoir 12 for containing a tooth cleansing material, such as a liquid. Detachably connected to one end of the body 11 is an end member 13 therefor, tapered in its outer extremity and provided therein with a recess for receiving the reduced end 14 of a brush nozzle 15 having a main and branch passages 16 and 17 therein through which the cleansing material flows to the bristles of the brush. A material conduit extends longitudinally through the end member 13 and, at 18, said conduit is enlarged and formed with longitudinally extending grooves 19 through which flows the material from the reservoir in its passage to the brush nozzle. At a point adjacent the end of the handle to which the member 13 is attached, the body 11 is provided therein with a valve seat 20 and between said seat and said end member 13 there is movably disposed a valve 21 normally held in close relation to said seat 20 by a spring 22 coiled about the stem 23 of the valve, which stem extends into and is guided in the conduit 18.

The end of the body 11 opposite the end member 13 has another end member 24 threaded therein and the inner end of this member constitutes a valve seat 25 which is normally closed by a valve 26 forming a part of a valve operating member such as the elongated plunger rod 27. This rod is slidably mounted in an opening 28 in the end member 24 and arranged about the wall of said opening are several air passages 29 for the admission of air into the reservoir 12 when the rod 27 is operated to move the valves 21 and 26 to opened position. The inner end of the rod 27 extends completely through the reservoir 12 and into the aperture of the valve seat 20 so that when said rod is forced inwardly the same will directly contact the valve 29 and force the same to open position against the tension of its spring 22, thereby allowing the liquid in the reservoir 12 to flow through the valve seat 20 and the passages 19 to the nozzle 15. At its outer end, the opening 28 in the end member 24 is enlarged as indicated at 30, and disposed partially within this enlargement is the operating head 31 of the plunger rod 27. The inner end of said head is provided with air ducts 32 which permit of the flow of air through the passages 29 and into the reservoir when the plunger rod 27 has been forced inwardly by pressure upon the head 31 until the inner end of the latter engages the shoulder 33 of the end member.

A spring 34 is interpositioned between a portion of the end member 24 and the head 31 and acts to restore the plunger rod 27 to the normal position of Figure 1 when pressure upon the head 31 is relieved.

The form of the invention illustrated in Figures 6 to 9 is especially adapted for the dispensation of a cleansing paste or cream and, like the modification previously described, consists of a cylindrical body 35 having the end member 36 attached to one end thereof, with the brush nozzle 37 detachably connected to said end member, said elements 36 and 37 being of the same construction as the corresponding elements 13 and 15. A spring pressed discharge valve 38, similar to the valve 21, cooperates with the valve seat 39 in the reservoir within the body 35 to control the flow of material from the reservoir, and said valve 38 is operated by a plunger rod 40 which, in this instance, is removable longitudinally of the body 35 and also rotatable with respect thereto. The rotation of said rod is utilized to accomplish the longitudinal movement of a follower 41 which is notched in its periphery to receive a key 42 formed upon the inner wall of the body 35 so as to prevent the rotation of said follower. The rod 40 is provided with a spiral groove 43, or its equivalent, in which is engaged a lug 44 formed on the follower so that as the rod 40 is rotated in either direction, the follower will be correspondingly moved. In order to inject a supply of material into the reservoir, the body 35 is provided with a threaded inlet 45 to which may be attached a flexible tube containing a supply of the material and from which the latter may be forced to the reservoir.

An end member 46, somewhat similar to the end member 24, is mounted in the end of the body 35 remote from the end member 36, and the inner end of said member 46 constitutes a valve seat 47 normally closed by the air intake valve 48. Passages 49 surrounding the portion of the rod 40 within the end member, permit of the flow of air into the reservoir behind the follower 41 when the rod 40 is moved longitudinally by pressure against its operating head 50, such pressure being exerted against the tension of the coil spring 51. Adjacent the outer extremity of the end member 46 the same is provided with an annular internal channel or groove 52, and an opening or notch 53 in said end member permits of the entrance of a pin 54 on said head 50 into said annular groove when the rod 40 is forced inwardly to open the valves 38 and 48. When this preliminary step has been accomplished, the operating head 50 and its rod 40 are rotated so as to advance the follower 41 and thus force material from the reservoir into the end member 36 and the nozzle 37. As the rotation of the rod 40 progresses, the pin 54 will be engaged in the groove 52 and will thus prevent restoration of the operating rod under the influence of the spring 51 should the head 50 be temporarily released by the operator. When the head 50 has been given a complete revolution, which is sufficient to discharge the required quantity of material from the reservoir, the pin 54 will again register with the notch 53 and, upon release of the operating head, the spring 51 will restore the operating rod to the normal position of Figure 6.

Instead of employing the means just described for preventing premature restoration of the operating rod, a construction such as shown in Figure 10 may be used. Herein, the end member 46 has pivotally connected thereto a bail 55 which is movable from the dotted to the full line position to engage over the operating head 50 of the rod 40 and which, when so engaged, prevents outward movement of said head 50, at the same time permitting rotary movement thereof.

What is claimed is:

1. A dispensing means for a fountain tooth brush comprising a handle forming a reservoir, having a valve seat at one end, an end member on said handle forming another valve seat, a valve in said handle normally engaging the first named seat, a valve operating plunger rod normally spaced from said valve and slidable in said end member relative to said valve for operating contact therewith to open the same to permit passage of cleansing material from said reservoir, and a second valve on said rod in cooperative relation to said other valve seat to control the admission of air through said end member into said reservoir.

2. A dispensing device for a fountain tooth brush comprising a reservoir, a normally closed valve controlling the passage of cleansing material from said reservoir, a valve operating plunger rod movable longitudinally and rotatable in said reservoir and normally out of contact with said valve, means to move said rod longitudinally to contact and thereby open said valve and also to rotate said rod, and a follower operated by the rotation of said rod to force material from said reservoir when said valve is opened.

FELIX KAPELMAN.